United States Patent [19]
Yehushua et al.

[11] Patent Number: 5,943,623
[45] Date of Patent: Aug. 24, 1999

[54] INTEGRATED CONTROL AND SIGNAL PROCESSING IN A CELLULAR TELEPHONE

[75] Inventors: Moshe Yehushua; Graham Avis; John Ratzel, all of San Diego, Calif.

[73] Assignee: Hughes Electronics Corporation, El Segundo, Calif.

[21] Appl. No.: 08/942,374

[22] Filed: Oct. 2, 1997

Related U.S. Application Data

[63] Continuation of application No. 08/376,480, Jan. 20, 1995, abandoned, which is a continuation of application No. 07/890,748, May 28, 1992, abandoned.

[51] Int. Cl.⁶ .................................................. H04Q 7/32
[52] U.S. Cl. .................................... 455/550; 364/705.05
[58] Field of Search .................................. 455/550, 556, 455/575; 364/230.2, 230.3, 241.2, 705.01, 705.05; 711/5, 173; 395/800.35

[56] References Cited

U.S. PATENT DOCUMENTS

| | | | |
|---|---|---|---|
| 4,803,703 | 2/1989 | DeLuca et al. | 370/106 |
| 5,034,887 | 7/1991 | Yasui et al. | 711/173 X |
| 5,164,923 | 11/1992 | Avis | 379/59 X |
| 5,193,091 | 3/1993 | Crisler et al. | 455/33.1 X |
| 5,228,074 | 7/1993 | Mizikovsky | 455/33.1 X |
| 5,630,153 | 5/1997 | Intrater et al. | 395/800.35 |

FOREIGN PATENT DOCUMENTS 0-465-054  8/1992  European Pat. Off. .

OTHER PUBLICATIONS

Electronic Design, vol. 36, No. 23, Oct. 13, 1988, Hasbrouck Heights, New Jersey, US pp. 157–159; Bursky, "Merged Resources Solve Control Headaches".

IBM Technical Disclosure Bulletin, vol. 31, No. 3, Aug. 1988, New York, US, pp. 382–387 "Memory Management with Multi–Tasking and Bank Switched Memory".

A.M. Lister, "Fundamentals of Operating Systems" 1979 MacMillan Press, Old Woking, GB, pp. 103, 104.

Computer Design, vol. 28, No. 3, Feb. 1, 1989, Littleton, Massachusetts U.S., pp. 88–105, R. Wilson, "Real–Time Executives Take On Newest Processors," pp. 99–100, 102.

EDN Electrical Design News, vol. 36, No. 20, Oct. 1, 1991, Newton, Massachusetts US, pp. 104–133, D. Shear, "DSP--Chip Directory," pp. 106–107.

Primary Examiner—Dwayne D. Bost
Assistant Examiner—William G. Trost
Attorney, Agent, or Firm—John T. Whelan; Michael W. Sales

[57] ABSTRACT

Control functions are integrated into the digital signal processing (DSP) chip functioning as the central processor unit (CPU) for the subscriber's cellular telephone unit, eliminating the microcontroller and other support chips. The integration provided is not a physical integration combining the DSP and microcontroller chips into a single chip architecture, but rather a logical (i.e., software) integration. A real time preemptive executive controls the execution of the different functions and the messaging between them. The amount of code that has to run on the DSP chip acting as the CPU is larger than the address space of the DSP chip, so the code memory is divided into banks with only one bank being activated at a time. It is the job of the real time executive to activate the banks as required to control the various functions.

5 Claims, 5 Drawing Sheets

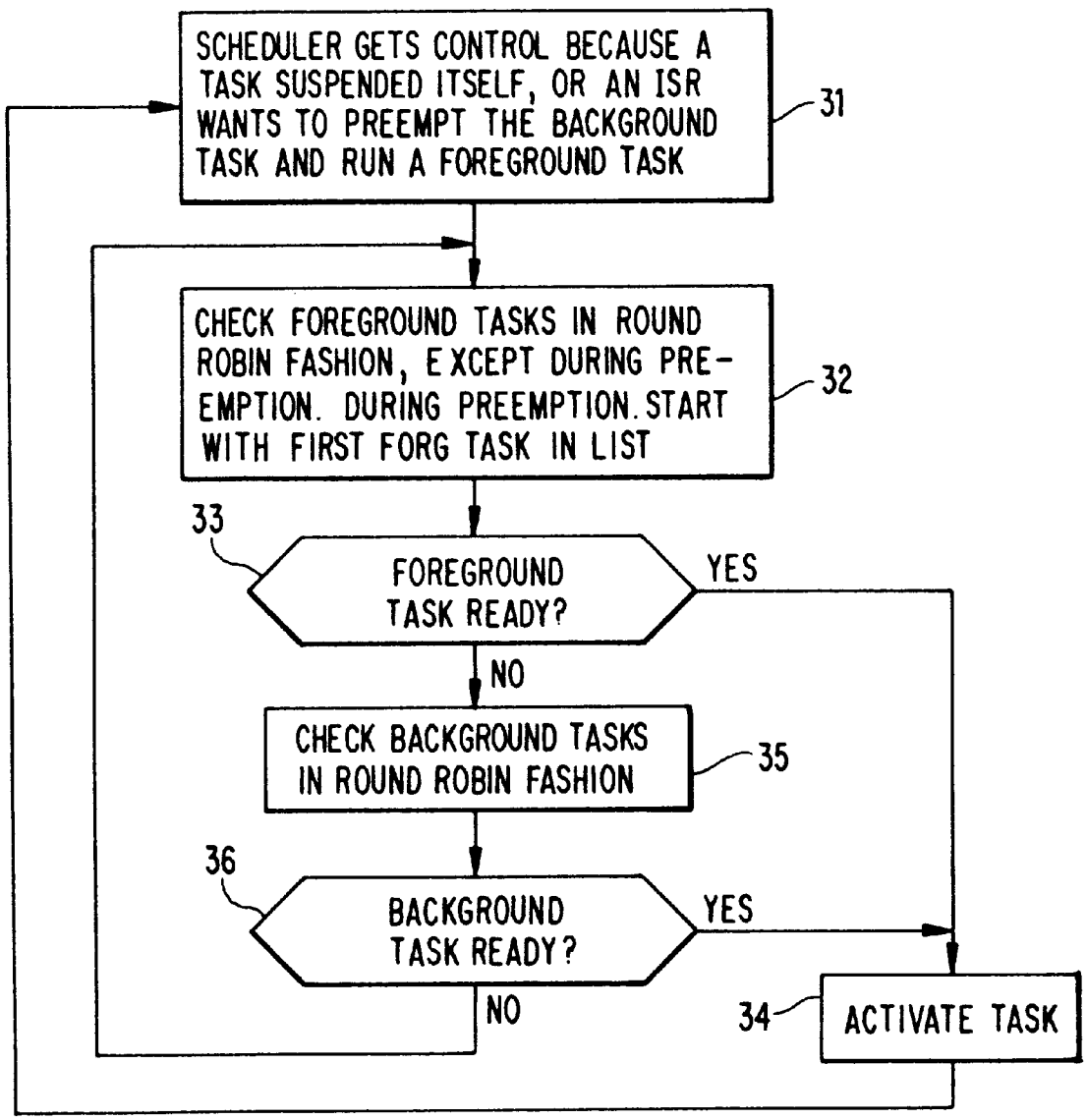

INTEGRATED CONTROL AND SIGNAL PROCESSING IN A CELLULAR TELEPHONE

This is a continuation of application Ser. No. 08/376,480, filed Jan. 20, 1995, now abandoned which is a continuation application of Ser. No. 07/890,748, filed May 28, 1992, now abandoned.

BACKGROUND OF THE INVENTION

1. Field of the Invention

The present invention generally relates to digital voice communications systems and, more particularly, to integrated control and signal processing functions in a cellular telephone.

2. Description of the Prior Art

A digital cellular subscriber unit contains functions such as voice coding, modem and equalization, that are implemented by a digital signal processor (DSP) chip, and control functions such as call processing, user interface and the like that are implemented by a separate microcontroller. The logic behind the common practice of using a microcontroller to implement control functions is that these functions do not need a very fast central processor unit (CPU) like a DSP but need a lot of code space, usually written in a high level language, and are prone to many modifications during the software development and maintenance cycle. A DSP chip architecture is more suitable to implement DSP algorithms, such as digital filtering. Since those algorithms are CPU intensive, they are usually written in assembly language.

SUMMARY OF THE INVENTION

It is therefore an object of the present invention to provide a new design in which a DSP chip integrates both control and signal processing functions, thus eliminating the need for a separate microcontroller.

It is another object of the invention to reduce the cost and increase the reliability of a subscriber cellular telephone unit by reducing the number of parts used in the unit.

According to the invention, control functions are integrated into the digital signal processing (DSP) chip functioning as the central processor unit (CPU) for the subscriber's telephone unit. The microcontroller and other support chips are thereby eliminated. However, the integration provided by the invention is not a physical integration combining the DSP and microcontroller chips into a single chip architecture. In fact, the DSP chips are commercially available chips supplied by third party sources, so the option of a physical integration is not possible. Rather, the invention accomplishes the integration of the DSP and control functions by a logical (i.e., software) integration.

In order to do this, a real time preemptive executive was developed to control the execution of the different functions and the messaging between them. The control software is implemented in a high level language, while the DSP algorithms are implemented in assembly language. The amount of code that has to run on the DSP chip acting as the CPU is larger than the address space of the DSP chip, so a scheme was devised where the code memory is divided into banks with only one bank being activated at a time. It is the job of the real time executive to activate the banks as required to control the various functions.

The reduction in chip count not only reduces the cost of the subscriber unit, there is also a significant improvement in the reliability of the unit. When the subscriber unit is implemented as a portable device, the savings in board size and power are also significant.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a flowchart showing the logic of the scheduler which comprises the main module within the real time executive of the software control.

DETAILED DESCRIPTION OF A PREFERRED EMBODIMENT OF THE INVENTION

Figure 1:
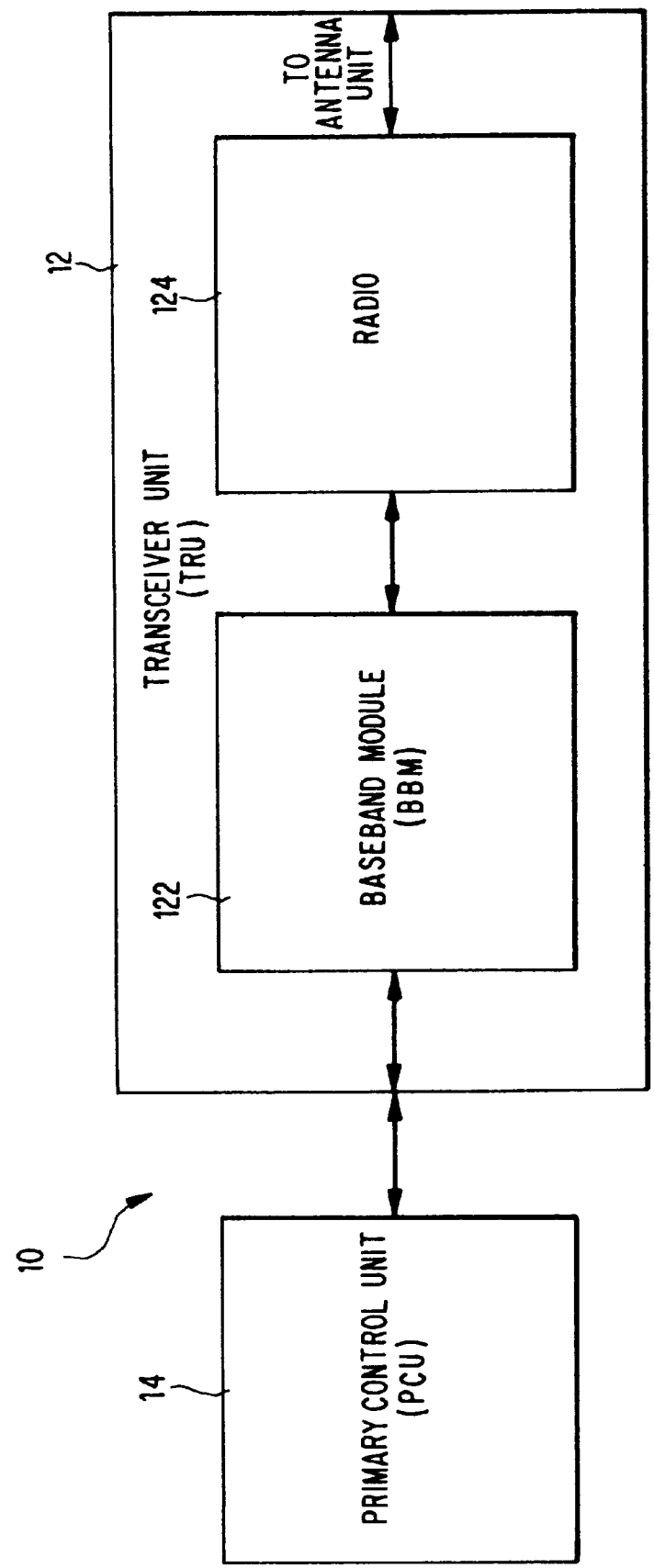
FIG. 1 is a high level block diagram showing the basic units of a subscriber unit on which the invention may be implemented.

Referring now to the drawings, and more particularly to FIG. 1, there is shown a high level block diagram of a subscriber unit 10 comprising a transmit receiver unit (TRU) 12, which usually resides in the trunk of the car, and a primary control unit (PCU) 14, which is in the handset. The TRU 12 includes a baseband module (BBM) 122 and a radio 124, the latter of which is connected to an antenna (not shown). The BBM functions include digital signal processor (DSP) intensive functions such as modem, equalization, voice processing and coding/decoding for error corrections, and control functions which include call processing, user interface, monitoring and diagnostics. In the past, these functions have been implemented using two types of chips, one or more DSP chips and a microcontroller chip.

Figure 2:
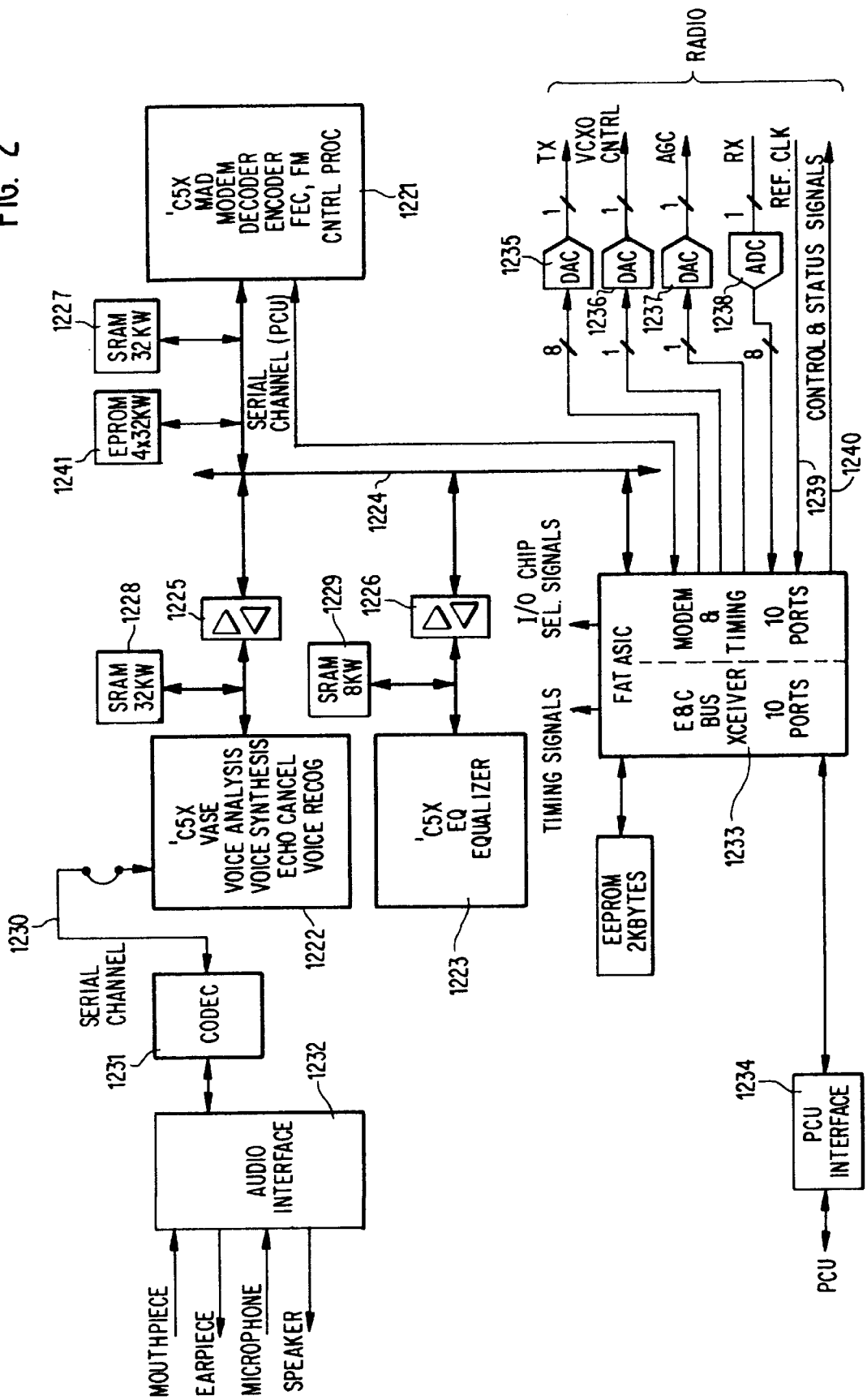
FIG. 2 is a detailed block diagram of the baseband module in the transceiver unit shown in FIG. 1.

FIG. 2 shows in more detail the functional components of the BBM 122. In the specific embodiment illustrated, the BBM has three DSP chips, 1221, 1222 and 1223, as dictated by the peak processing needed during the digital mode operation. The DSP chips are named according to the main processes they perform as follows:

1. MAD: Modem and Decoder processor chip 1221;
2. VASE: Voice Analysis, Synthesis and Echo cancellation processor chip 1222; and
3. EQ: Equalizer processor chip 1223.

These three DSP chips communicate via a system bus 1224. In the case of the VASE and EQ chips 1222 and 1223, the interfaces to the system bus 1224 are via bi-directional buffers 1225 and 1226, respectively. The MAD chip 1221 accesses an electronically programmable read only memory (EPROM) 1241 and a dedicated static random access memory (SRAM) 1227 having a storage capacity of 32 kilowords (KW), where a word is two bytes or sixteen bits. Similarly, the VASE chip 1222 accesses a dedicated SRAM 1228 having a storage capacity of 32 KW, and the EQ chip 1223 accesses a dedicated SRAM 1229 of 8 KW. The SRAMs 1227, 1228 and 1229 serve as the random access memories (RAMs) for their respective DSP chips.

The VASE chip 1222 is connected via a serial channel 1230 to a coder/decoder (CODEC) 1231 which, in turn, is connected to the audio interface 1232. The audio interface 1232 provides the interface to the handset mouthpiece and earpiece as well as to a separate microphone and speaker, all of which is conventional.

The MAD chip 1221 performs the modem and encoding/decoding algorithms when in the digital mode and the digital FM algorithms during the analog mode. It also interfaces to the FIR (Finite Impulse Response) filter and Timing (FAT) implemented in the application specific integrated circuit (ASIC) 1233. The FAT ASIC 1233 provides the communication to the PCU 14 (see FIG. 1) via PCU interface 1234. Additionally, the FAT ASIC 1233 interfaces to the radio 124 (see FIG. 1) via digital-to-analog converters (DACs) 1235, 1236 and 1237 and analog-to-digital converter (ADC) 1238. More specifically, the DAC 1235 receives eight lines of digital data and supplies one line of analog signal (Tx) for the radio transmitter. DAC 1236 receives a single line of digital data and generates an analog signal (VCXO) to control the radio oscillator, and DAC 1237 receives a single line of digital data and generates an analog signal (AGC) to control the gain of the radio. The ADC 1238 receives the demodulated radio signal (Rx) and generates digital data on eight lines to the FAT ASIC 1233. In addition, the FAT ASIC 1233 receives a reference clock on line 1239 and provides control and status signals on line 1240. All of this is conventional and requires no further explanation to those skilled in the art.

In order to save the cost of a microcontroller, the present invention puts all control functions on the MAD 1221 since it is the central processor unit (CPU). Those control functions include call processing, user interface, monitoring and diagnostics, and real time executive. The control functions do not require a lot of CPU power, but they include a lot of code, and for this reason they are written in a high level language, C, which makes it easy to implement and modify the code. The DSP functions need most of the CPU time, so they are written in assembly language and downloaded from EPROM 1241 to SRAM 1227 so that they run with zero wait-states.

The amount of code that runs on the MAD 1221 is bigger than its address space of 64 K words, so a scheme was devised where the EPROM memory 1241 is divided into four banks of 32 K words each, and at any instant of time only one bank is activated. The 64 KW of MAD address space is allocated to the EPROM 1241, which occupies the upper 32 KW of memory space, and the SRAM 1227, which occupies the lower 32 KW of memory space. At power up, Bank 0 is active, and this bank contains the power up initialization software and downloading routines. In order to save board space and cost of additional EPROMs, the VASE and EQ programs are stored on the MAD EPROM 1241. After power up, the MAD 1221 downloads those programs to the corresponding processor SRAMs 1228 and 1229 and resets the processors 1222 and 1223, respectively.

A real time executive (EXEC) was developed to control the execution of the various tasks running on the MAD 1221 and the transfer of data between those tasks. The EXEC maintains a table of the various tasks, their state, and the bank number on which they reside. Thus, when the EXEC needs to run a task, it first activates the memory bank on which the task resides, then it accesses the routines to execute and control the task. When the task finishes executing, it suspends itself and returns control to the EXEC. The EXEC is down loaded to the SRAM 1227 after power up, and it runs from the SRAM so that the EXEC routines are accessible from any memory bank of EPROM 1241.

Figure 3:
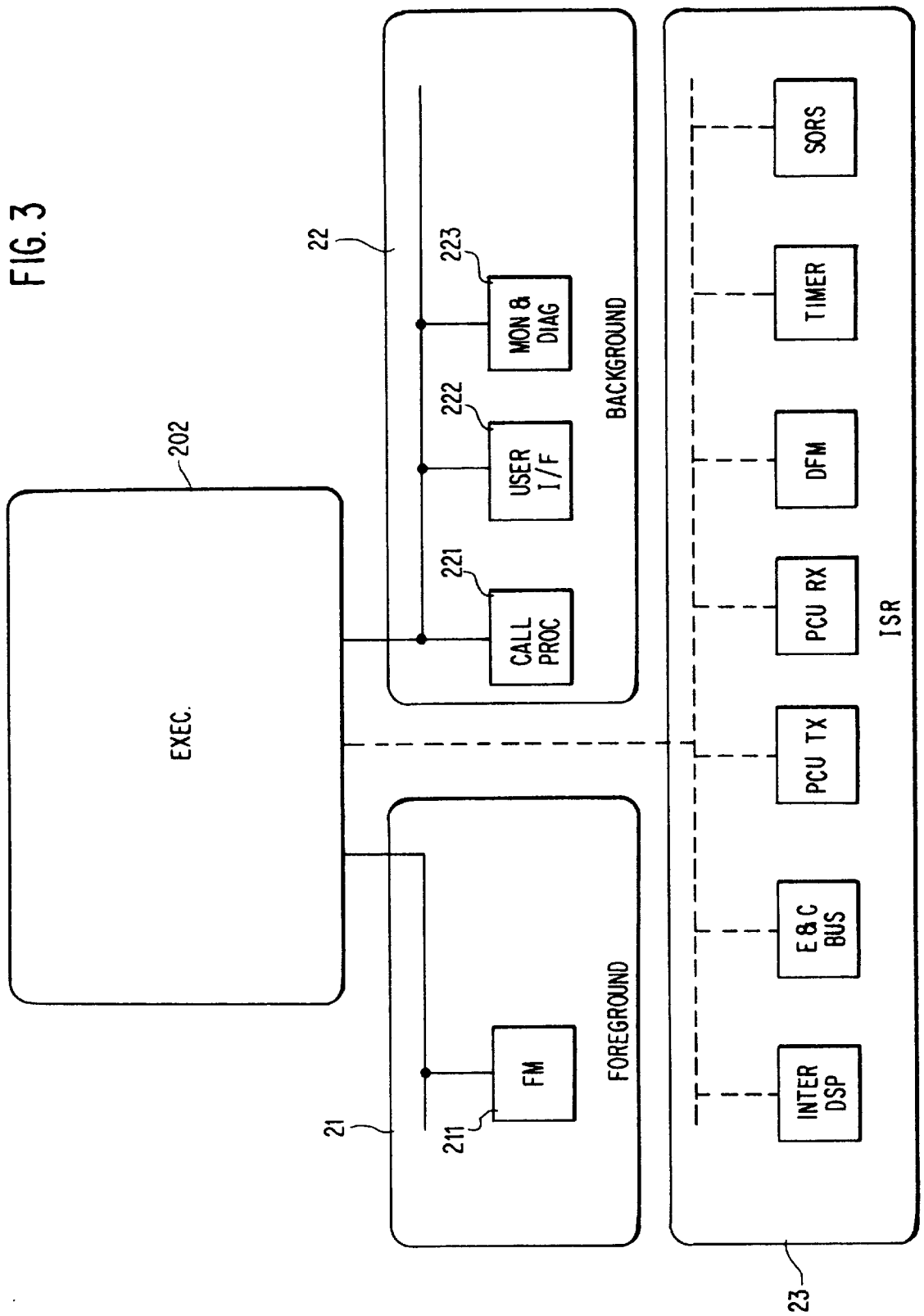
FIG. 3 is functional block diagram of the software control for analog mode operation of the subscriber unit.
Figure 4:
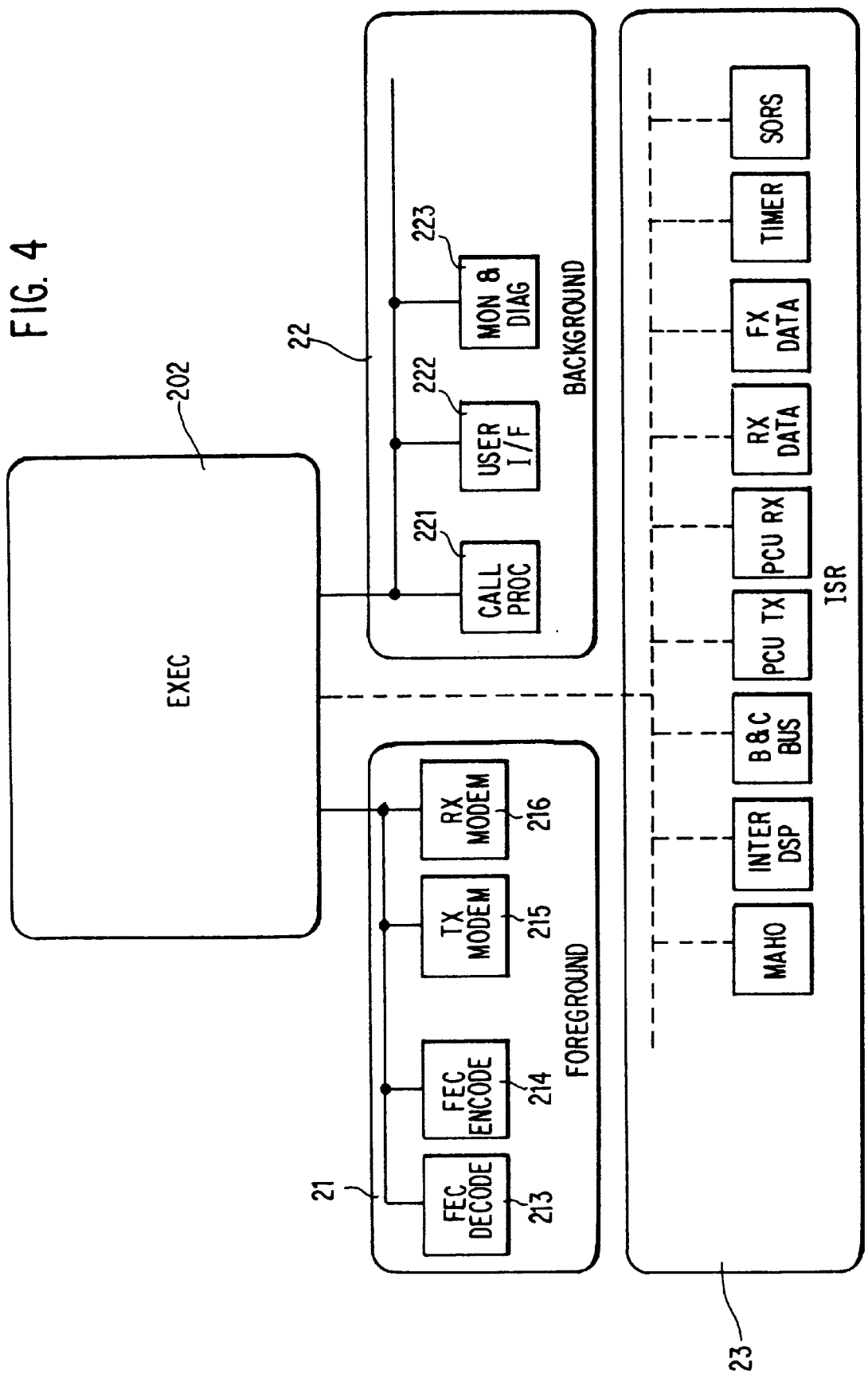
FIG. 4 is a function block diagram of the software control for digital mode operation of the subscriber unit.

FIGS. 3 and 4 show the tasks that run on the MAD 1221 during analog and digital modes, respectively. Referring first to FIG. 3, the analog mode supports a frequency shift keying, frequency modulation (FSK/FM) communication protocol. The EXEC 202 controls two types of tasks, foreground tasks 21 and background tasks 22. The foreground tasks include FM control 211. The background tasks include call processing 221, user interface (I/F) 222 and monitoring and diagnostics 223. When an interrupt occurs, an ISR (Interrupt Service Routine) is invoked to process the interrupt. An ISR may call a scheduler function to preempt the current background task and execute a foreground task. When the foreground task finishes executing, it calls the scheduler which may then resume executing the preempted background task.

FIG. 4 shows the digital mode which supports a quadrature phase shift keying (QPSK) communication protocol and differs from FIG. 3 only in the specific nature of the foreground tasks and some of the ISR. Specifically, the foreground tasks 21 include FEC decode 213, FEC encode 214, transmit (Tx) modem 215, and receive (Rx) modem 216. The foreground tasks during QPSK mode are:

1) Rx Modem—This task demodulates the data received from the radio via the FAT ASIC.

2) FEC Decode—This task forward-error-corrects the data received from the Rx modem. If the data contains control messages, then it is sent to the call processing task.

3) FEC Encode—This task convolutionally encodes the voice data or the control messages received from the call processing task.

4) Tx Modem—This task sends the encoded data to the FAT ASIC that does FIR filtering and sends the output to the radio.

Both foreground and background tasks run under the control of a task scheduler which is a module within the EXEC 202. A background task can be preempted and runs at a lower priority than a foreground task. A foreground task cannot be preempted by the scheduler.

FIG. 5 shows the flowchart of the scheduler, which is the main module within the real time executive. In function block 31, the scheduler gets control because a task suspended itself or an ISR wants to preempt the background task and run a foreground task. Once the scheduler has control, it first checks in function block 32 each of the foreground tasks consecutively except in the case of a preemption. In the case of a preemption, the scheduler starts with the first foreground task in the list of foreground tasks. A test is then made in decision block 33 to determine if a foreground task is ready. If so, the task is activated in function block 34 before a return is made to function block 31. If the task is not ready, then the scheduler checks in function block 35 the background tasks consecutively. A second test is made in decision block 36 to determine if a background task is ready. If so, the task is activated in function block 34; otherwise, a return is made to function block 32 to repeat the process, checking first foreground tasks and then background task until a task is found ready.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A cellular telephone baseband module comprising:

a digital signal processor programmed to logically integrate signal processing functions and control functions;

executive control means for controlling tasks running on the digital signal processor; and memory means addressable by said digital signal processor for storing a program for said signal processing functions and said control functions, said memory means being selectively activated by said executive control means;

said digital signal processor operating within said cellular telephone baseband module without a separate microcontroller.

2. The cellular telephone baseband module recited in claim 1 wherein said memory means is divided into a plurality of banks containing program memory, the size of said banks being less than or equal to said accessible memory space.

3. The cellular telephone baseband module recited in claim 2 wherein said memory means further includes working memory means for temporarily storing program functions downloaded from said program memory banks, one bank of said program memory and said working memory means defining said memory space accessible by said digital signal processor.

4. The cellular telephone baseband module recited in claim 3 wherein said executive control means for controlling tasks running on the digital signal processor contains a table of tasks with information about the bank on which each task resides and activates a bank of said program memory on which a task resides when a task is scheduled to execute.

5. The cellular telephone baseband module recited in claim 1, wherein the cellular telephone baseband module is implemented in a single chip architecture.

* * * * *